(12) United States Patent
Zhao et al.

(10) Patent No.: US 11,010,559 B2
(45) Date of Patent: May 18, 2021

(54) MULTI-ASPECT SENTIMENT ANALYSIS BY COLLABORATIVE ATTENTION ALLOCATION

(71) Applicant: INTERNATIONAL BUSINESS MACHINES CORPORATION, Armonk, NY (US)

(72) Inventors: Shiwan Zhao, Beijing (CN); Meng Ting Hu, Tianjin (CN); Li Zhang, Beijing (CN); Zhi Hu Wang, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 16/117,431

(22) Filed: Aug. 30, 2018

(65) Prior Publication Data

US 2020/0073937 A1    Mar. 5, 2020

(51) Int. Cl.
*G06F 17/27* (2006.01)
*G06F 40/30* (2020.01)
*G06N 3/08* (2006.01)

(52) U.S. Cl.
CPC .............. *G06F 40/30* (2020.01); *G06N 3/08* (2013.01)

(58) Field of Classification Search
None
See application file for complete search history.

(56) References Cited

U.S. PATENT DOCUMENTS

| | | | |
|---|---|---|---|
| 9,690,772 B2 | 6/2017 | Brun et al. | |
| 9,704,097 B2 | 7/2017 | Devarajan et al. | |
| 10,347,244 B2 * | 7/2019 | Goel | G10L 17/18 |
| 10,417,498 B2 * | 9/2019 | Hori | G06K 9/00718 |
| 10,459,928 B2 * | 10/2019 | Chang | G06F 16/3325 |
| 2017/0124432 A1 | 5/2017 | Chen et al. | |
| 2017/0357720 A1 | 12/2017 | Torabi et al. | |
| 2018/0018562 A1 * | 1/2018 | Jung | G06F 16/22 |
| 2018/0053107 A1 | 2/2018 | Wang et al. | |

(Continued)

FOREIGN PATENT DOCUMENTS

CN    107092596 A    8/2017

OTHER PUBLICATIONS

Cheng et al., Aspect-level Sentiment Classification with HEAT (HiErarchical ATtention) Network, Proceedings of the 2017 ACM Conference on Information and Knowledge Management. Nov. 6-10, 2017. pp. 1-2. (Abstract).

(Continued)

*Primary Examiner* — Satwant K Singh
(74) *Attorney, Agent, or Firm* — Tutunjian & Bitetto, P.C.; Joseph Petrokaitis

(57) ABSTRACT

A computer-implemented method is presented for implementing multi-aspect sentiment analysis by collaborative attention allocation. The method includes extracting a sequence of word vectors from a sentence received from a data stream, feeding the sequence of word vectors to long short-term memory (LSTM) neural networks to generate a sequence of hidden states corresponding to the sequence of word vectors, generating a plurality of aspect embedding vectors for each aspect, employing an attention mechanism to determine attention weight vectors concurrently for all aspects, and outputting predicted sentiments for each aspect of the sentence to a user interface of a computing device.

20 Claims, 6 Drawing Sheets

(56) References Cited

U.S. PATENT DOCUMENTS

2018/0129742 A1\* 5/2018 Li .................... G06K 9/00771
2018/0285344 A1  10/2018 He et al.
2018/0349359 A1\* 12/2018 McCann ................ G06N 3/08
2018/0365321 A1\* 12/2018 Ke ...................... G06N 3/0445
2018/0373682 A1\* 12/2018 McCann ................ G06F 40/30
2019/0278835 A1\* 9/2019 Cohan ................ G06N 3/0454

OTHER PUBLICATIONS

Huang et al., "Aspect Level Sentiment Classification with Attention-over-Attention Neural Networks", arXiv:1804.06536, Computer Science—Computation and Language. Apr. 18, 2018. pp. 1-15.

Jebbara et al., "Aspect-Based Relational Sentiment Analysis Using a Stacked Neural Network Architecture", arXiv:1709.06309, Computer Science—Computation and Language. Sep. 19, 2017. pp. 1-9.

Lin et al., "A Structured Self-Attentive Sentence Embedding", 2017 ICLR Conference. Mar. 9, 2017. pp. 1-15.

Lu et al., "Multi-aspect Sentiment Analysis with Topic Models", 2011 IEEE 11th International Conference on Data Mining Workshops. Dec. 11, 2011. pp. 1-2. (Abstract).

Wang et al., "Attention-based LSTM for Aspect-level Sentiment Classification", Proceedings of the 2016 Conference on Empirical Methods of Natural Language Processing. Nov. 1-5, 2016. pp. 606-615.

\* cited by examiner

MULTI-ASPECT SENTIMENT ANALYSIS BY COLLABORATIVE ATTENTION ALLOCATION

BACKGROUND

Technical Field

The present invention relates generally to sentiment analysis, and more specifically, to multi-aspect sentiment analysis by collaborative attention allocation.

Description of the Related Art

With the rise of the Internet and mobile electronic devices, users are generating increasing amounts of electronic content. Electronic content often takes the form of forum posts, text messages, social networking posts, blog posts, e-mails, chatroom discussions, or other electronic communications. In many cases, users express their sentiment (e.g., opinion, feeling, emotion, or attitude) about a thing, company, or other topic within the electronic content.

SUMMARY

In accordance with an embodiment, a method is provided for implementing multi-aspect sentiment analysis by collaborative attention allocation. The method includes extracting a sequence of word vectors from a sentence received from a data stream, feeding the sequence of word vectors to long short-term memory (LSTM) neural networks to generate a sequence of hidden states corresponding to the sequence of word vectors, generating a plurality of aspect embedding vectors for each aspect, employing an attention mechanism to determine attention weight vectors concurrently for all aspects, and outputting predicted sentiments for each aspect to a user interface of a computing device.

In accordance with another embodiment, a system is provided for implementing multi-aspect sentiment analysis by collaborative attention allocation. The system includes a memory and one or more processors in communication with the memory configured to extract a sequence of word vectors from a sentence received from a data stream, feed the sequence of word vectors to long short-term memory (LSTM) neural networks to generate a sequence of hidden states corresponding to the sequence of word vectors, generate a plurality of aspect embedding vectors for each aspect, employ an attention mechanism to determine attention weight vectors concurrently for all aspects, and output predicted sentiments for each aspect to a user interface of a computing device.

In accordance with yet another embodiment, a non-transitory computer-readable storage medium comprising a computer-readable program for implementing multi-aspect sentiment analysis by collaborative attention allocation is presented. The non-transitory computer-readable storage medium performs the steps of extracting a sequence of word vectors from a sentence received from a data stream, feeding the sequence of word vectors to long short-term memory (LSTM) neural networks to generate a sequence of hidden states corresponding to the sequence of word vectors, generating a plurality of aspect embedding vectors for each aspect, employing an attention mechanism to determine attention weight vectors concurrently for all aspects, and outputting predicted sentiments for each aspect to a user interface of a computing device.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for implementing sentiment analysis. Opinion mining, also termed as sentiment analysis, is the mining of opinions of individuals, their appraisals, and feelings in the direction of certain objects, facts and their attributes. Opinions play a very important role in making a proper decision. It is wise to get or listen to the opinions of other people while making a choice or decision. This scenario is not only true in the case of an individual choice, but today it is useful for organizations too. Sentiment analysis can occur at different levels, including at a document level, sentence level, and/or aspect/feature level.

In aspect/feature level sentiment analysis, the goal is to identify and extract object features that have been commented on by an opinion holder and determine whether the opinion is positive, negative or neutral. Aspect-level sentiment classification is a fine-grained task in sentiment analysis which aims to identify the sentiment polarity of targets in their context. Aspect-level sentiment classification is a fundamental task in natural language processing (NLP). Aspect based sentiment analysis is based on identifying aspects of given target entities and estimating the sentiment polarity for each mentioned aspect. This can be decomposed into two tasks, that is, aspect extraction and aspect sentiment classification. Aspect extraction pertains to recognizing aspects of the entity, and more generally can be seen as an information extraction task. Aspect sentiment classification determines whether the opinions on different aspects are positive, negative or neutral.

Embodiments in accordance with the present invention provide methods and devices for implementing a sentiment analysis system where multiple aspects are simultaneously or concurrently modeled with collaborative attention allocation. Attention vectors on different aspects are regularized so that the attention vectors have less overlapped distribution with each other.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
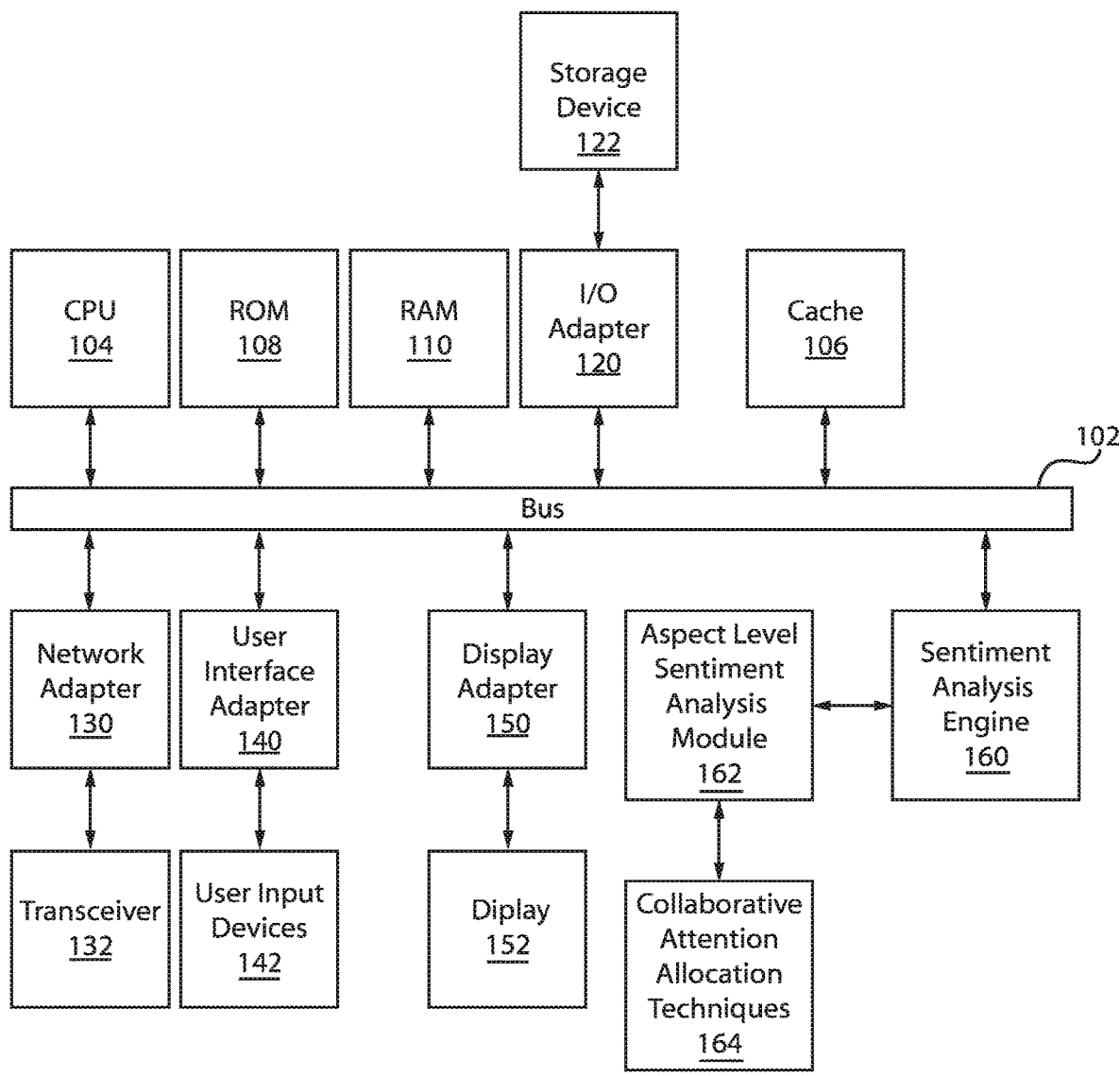
FIG. 1 is an exemplary processing system for sentiment analysis, in accordance with embodiments of the present invention.

FIG. 1 is an exemplary processing system for sentiment analysis, in accordance with embodiments of the present invention.

The processing system includes at least one processor (CPU) 104 operatively coupled to other components via a system bus 102. A cache 106, a Read Only Memory (ROM) 108, a Random Access Memory (RAM) 110, an input/output (I/O) adapter 120, a network adapter 130, a user interface adapter 140, and a display adapter 150, are operatively coupled to the system bus 102. Additionally, a sentiment analysis engine 160 can be connected to the system bus 102 in order to process an aspect level sentiment analysis module 162 by employing collaborative attention allocation techniques 164.

A storage device 122 is operatively coupled to system bus 102 by the I/O adapter 120. The storage device 122 can be any of a disk storage device (e.g., a magnetic or optical disk storage device), a solid state magnetic device, and so forth.

A transceiver 132 is operatively coupled to system bus 102 by network adapter 130.

User input devices 142 are operatively coupled to system bus 102 by user interface adapter 140. The user input devices 142 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 142 can be the same type of user input device or different types of user input devices. The user input devices 142 are used to input and output information to and from the processing system.

A display device 152 is operatively coupled to system bus 102 by display adapter 150.

Of course, the sentiment analysis processing system can also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the sentiment analysis processing system are readily contemplated by one of ordinary skill in the art given the teachings of the present invention provided herein.

Figure 2:
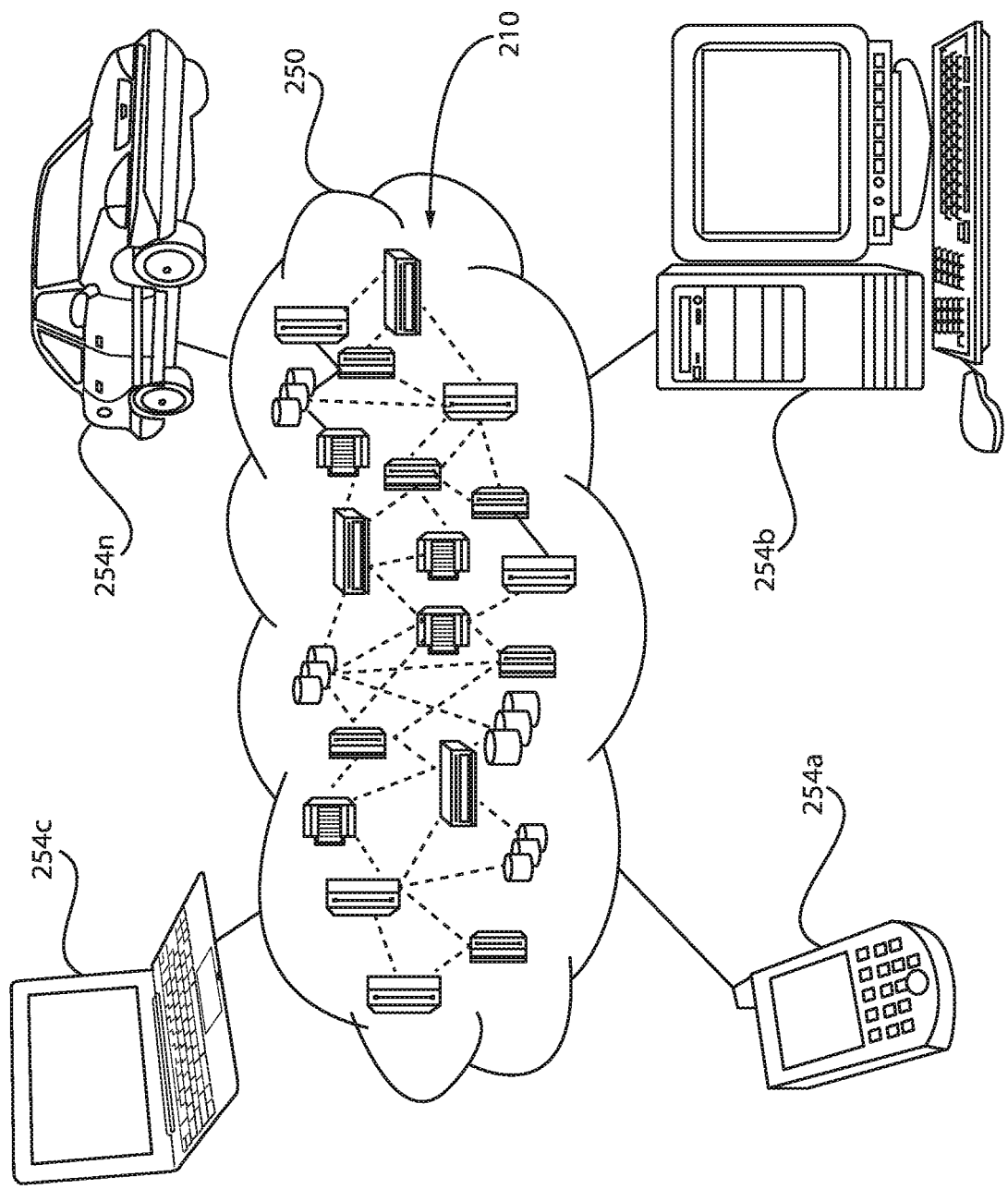
FIG. 2 is a block/flow diagram of an exemplary cloud computing environment, in accordance with an embodiment of the present invention.

FIG. 2 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 250 is depicted for enabling use cases of the present invention. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N can communicate. Nodes 210 can communicate with one another. They can be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
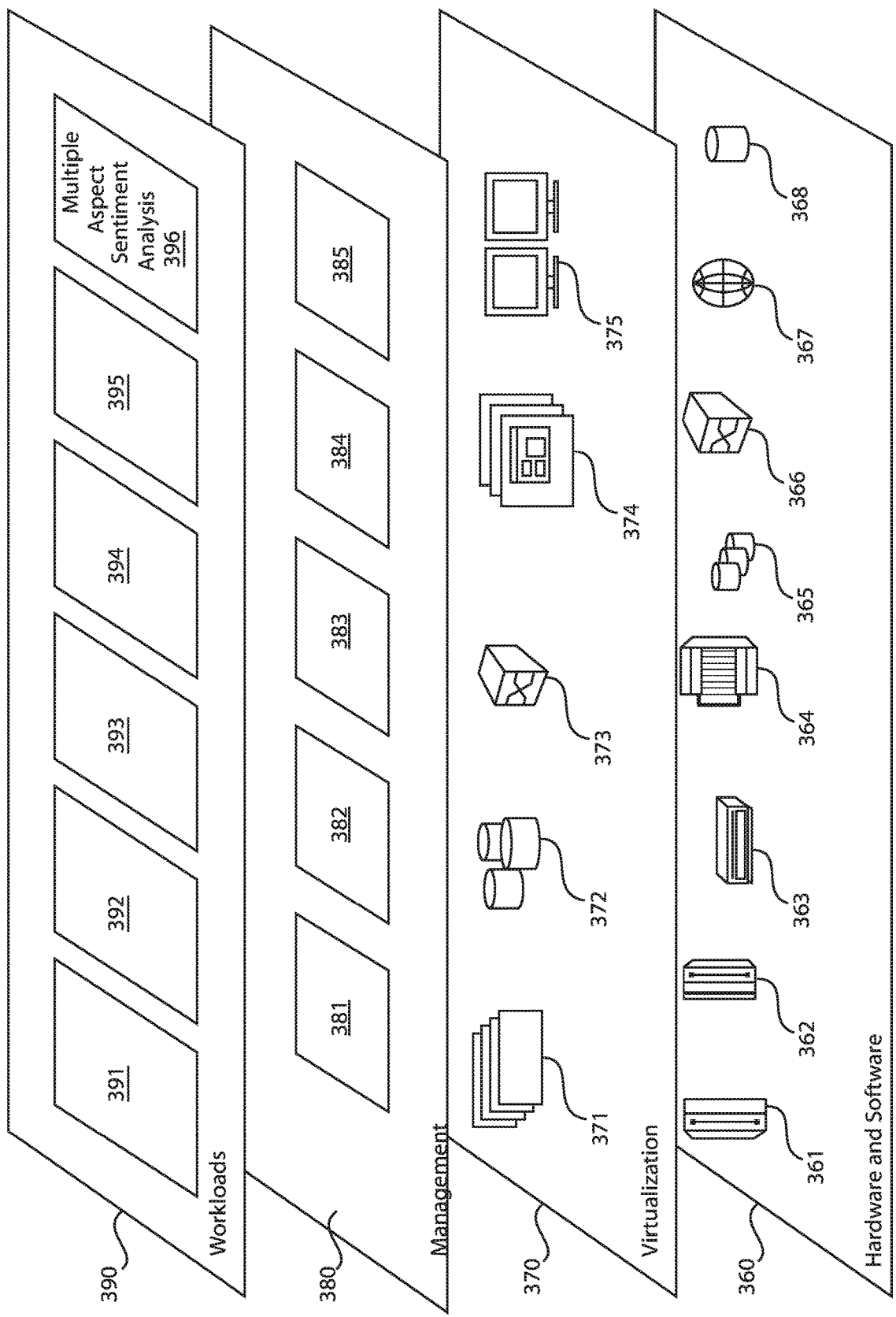
FIG. 3 is a schematic diagram of exemplary abstraction model layers, in accordance with an embodiment of the present invention.

FIG. 3 is a schematic diagram of exemplary abstraction model layers, in accordance with an embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities can be provided: virtual servers 371; virtual storage 372; virtual networks 373, including virtual private networks; virtual applications and operating systems 374; and virtual clients 375.

In one example, management layer 380 can provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment can be utilized. Examples of workloads and functions which can be provided from this layer include: mapping and navigation 391; software development and lifecycle management 392; virtual classroom education delivery 393; data analytics processing 394; transaction processing 395; and a multiple-aspect sentiment analysis engine 396.

Figure 4:
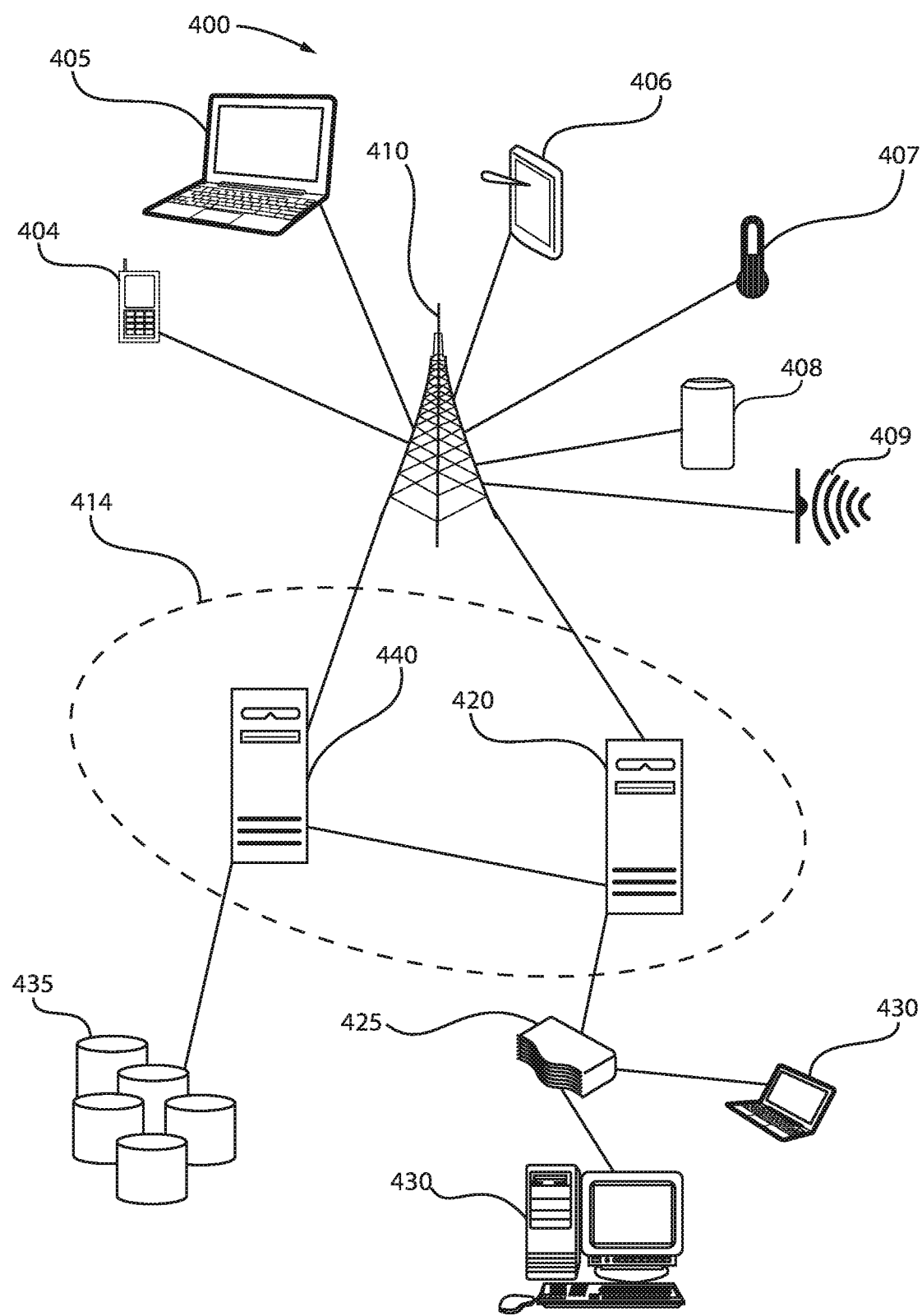
FIG. 4 is a block/flow diagram of an example of devices that can communicate with each other over an exchange system and via a network, in accordance with an embodiment of the present invention.

FIG. 4 is a block/flow diagram 400 of an example of devices that can communicate with each other over an exchange system and via a network, in accordance with an embodiment of the present invention.

As shown in FIG. 4, network device 404 can transmit a communication over a network (e.g., a cellular network via a base station 410). In some examples, the communication can include data with one or more sentiments. The communication can be routed to another network device, such as network devices 405-409, via the base station 410. The communication can also be routed to computing environment 414 via the base station 410. In some examples, the network device 404 can collect data either from its surrounding environment or from other network devices (such as network devices 405-409) and transmit that data to computing environment 414.

Although network devices 404-409 are shown in FIG. 4 as a mobile phone, laptop computer, tablet computer, temperature sensor, motion sensor, and audio sensor respectively, the network devices can be or include sensors that are sensitive to detecting aspects of their environment. For example, the network devices can include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that can be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors can be mounted to various components used as part of a variety of different types of systems. The network devices can detect and record data related to the environment that it monitors, and transmit that data to computing environment 414.

The network devices 404-409 can also perform processing on data they collect before transmitting the data to the computing environment 414, or before deciding whether to transmit data to the computing environment 414. For example, network devices 404-409 can determine whether data collected meets certain rules, for example by comparing data or values calculated from the data and comparing that data to one or more thresholds. The network devices 404-409 can use this data or comparisons to determine if the data is to be transmitted to the computing environment 414 for further use or processing. In some examples, the network devices 404-409 can pre-process the data prior to transmitting the data to the computing environment 414. For example, the network devices 404-409 can reformat the data before transmitting the data to the computing environment 414 for further processing (e.g., which can include automatically constructing a training set for electronic sentiment analysis using the data).

Computing environment 414 can include machines 420, 440. Although computing environment 414 is shown in FIG. 4 as having two machines 420, 440, computing environment 414 can have only one machine or can have more than two machines. The machines 420, 440 that make up computing environment 414 can include specialized computers, servers, or other machines that are configured to individually or collectively process large amounts of data. The computing environment 414 can also include storage devices that include one or more databases of structured data, such as data organized in one or more hierarchies, or unstructured data. The databases can communicate with the processing devices within computing environment 414 to distribute data to them. Since network devices can transmit data to computing environment 414, that data can be received by the computing environment 414 and subsequently stored within those storage devices. Data used by computing environment 414 can also be stored in data stores 435, which can also be a part of or connected to computing environment 414.

Computing environment 414 can communicate with various devices via one or more routers 425 or other inter-network or intra-network connection components. For example, computing environment 414 can communicate with client devices 430 via one or more routers 425. Computing environment 414 can collect, analyze or store data from or pertaining to communications, client device operations, client rules, or user-associated actions stored at one or more data stores 435. Such data can influence communication routing to the devices within computing environment 414, how data is stored or processed within computing environment 414, among other actions.

Notably, various other devices can further be used to influence communication routing or processing between devices within computing environment 414 and with devices outside of computing environment 414. For example, as shown in FIG. 4, computing environment 414 can include a machine 440 that is a web server. Computing environment 414 can retrieve data of interest, such as client information (e.g., product information, client rules, etc.), technical product details, news, blog posts, e-mails, forum posts, electronic documents, social media posts (e.g., Twitter™ posts or Facebook™ posts), and so on.

In addition to computing environment 414 collecting data (e.g., as received from network devices, such as sensors, and client devices or other sources) to be processed as part of a big data analytics project, it can also receive data in real time as part of a streaming analytics environment. As noted, data can be collected using a variety of sources as communicated via different kinds of networks or locally. Such data can be received on a real-time streaming basis. For example, network devices 404-409 can receive data periodically and in real-time from a web server or other source. Devices within computing environment 414 can also perform pre-analysis on data it receives to determine if the data received should be processed as part of an ongoing project. For example, as part of a project in which sentiment analysis is performed on data, the computing environment 414 can perform a pre-analysis of the data. The pre-analysis can include determining whether the data has previously undergone sentiment analysis. Additionally or alternatively, the pre-analysis can include determining whether the data is in a correct format for sentiment analysis and, if not, reformatting the data into the correct format.

Figure 5:
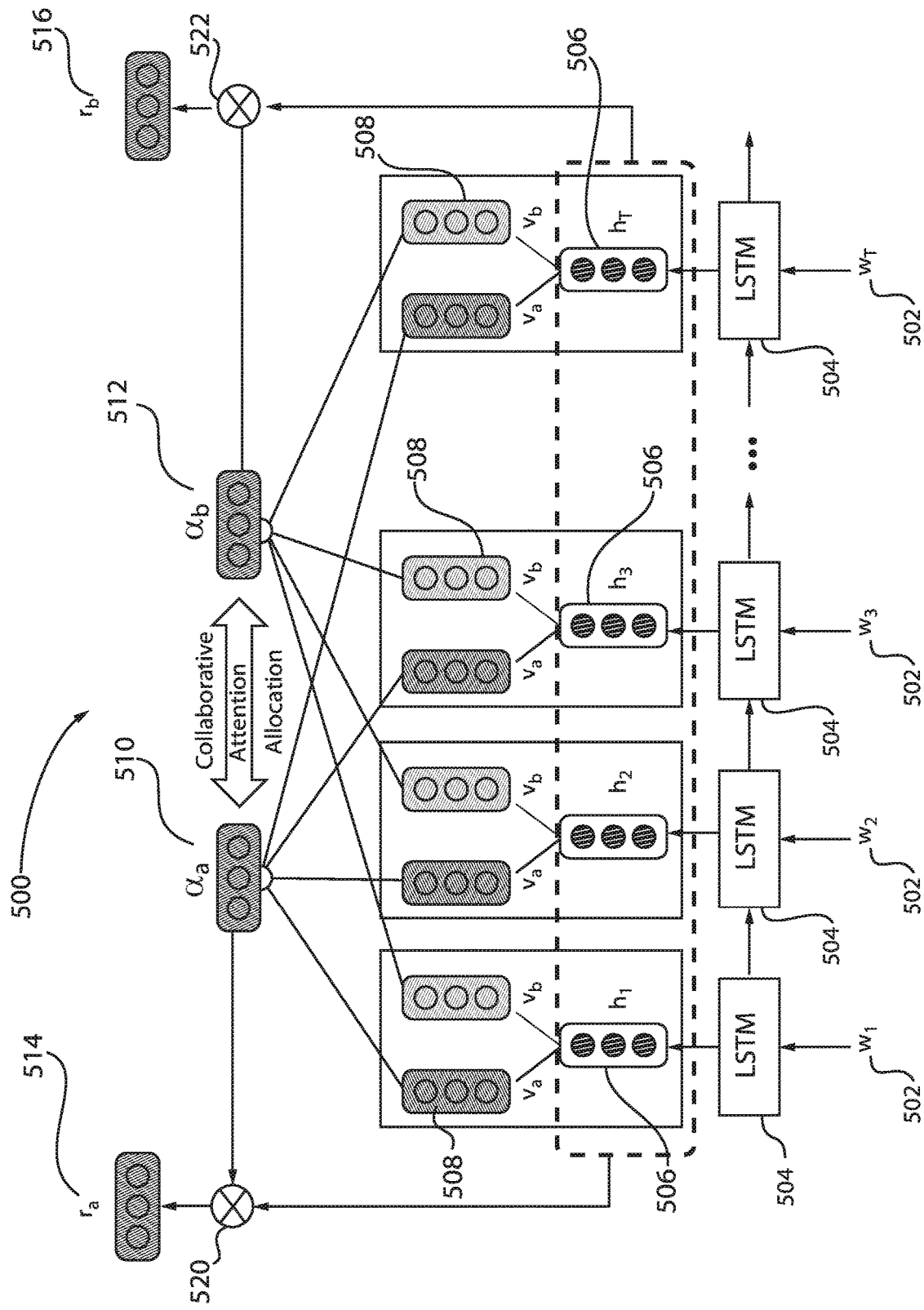
FIG. 5 is a block/flow diagram of a system for concurrently modeling multiple aspects with collaborative attention allocation, in accordance with an embodiment of the present invention.

FIG. 5 is a block/flow diagram of a system 500 for concurrently modeling multiple aspects with collaborative attention allocation, in accordance with an embodiment of the present invention.

A sentence can be represented by a plurality of word vectors 502 ($w_1, w_2, w_3 \ldots w_T$). Many deep learning models in natural language processing (NLP) need word embedding results as input features. Word embedding is a technique employed for language modeling and feature learning, which transforms words in a vocabulary to vectors of continuous real numbers. The technique normally involves a mathematic embedding from a high-dimensional sparse vector space (e.g., one-hot encoding vector space, in which each word takes a dimension) to a lower-dimensional dense vector space. Each dimension of the embedding vector represents a latent feature of a word. The vectors can encode linguistic regularities and patterns.

Each of the plurality of word vectors 502 can be fed into respective long short-term memory (LSTM) networks 504. Recurrent Neural Networks (RNNs) are an extension of conventional feed-forward neural network. However, standard RNNs have gradient vanishing or exploding issues. Thus, in order to overcome such issues, LSTM networks 504 are employed to achieve superior performance.

Each LSTM network 504 produces hidden vectors 506 (or hidden layers 506). The hidden states 506 are regarded as the memory of the network. The hidden states 506 capture information about what happened in all previous time steps. In RNNs, predictions are made sequentially, and the hidden layer from one prediction is fed to the hidden layer of the next prediction. This gives the network "memory," in the sense that the results from previous predictions can inform future predictions. LSTMs 504 add additional factors to a traditional RNN that give it more of a fine-grained control over memory. These factors control how much the current input matters in creating the new memory, how much the previous memories matter in creating the new memory, and what parts of the memory are important in generating the output.

The hidden vectors 506 are then fed through aspect embedding 508. In other words, the aspects are embedded into aspect vectors. The standard LSTM cannot detect which is the important part for aspect-level sentiment classification. In order to address this issue, an attention mechanism 510, 512 is employed that can capture the key part of the sentence in response to a given aspect. Thus, LSTM networks 504 are combined with aspect embedding 508.

The attention mechanism 510, 512 produces an attention weight vector a and a weighted hidden representation r. In particular, the aspect vectors and the hidden states are employed to compute the attention weights for each aspect. In the system 500, there are two attention weight vectors, first attention weight vector 510 ($\alpha_a$) and second attention weight vector 512 ($\alpha_b$). Further, in the system 500, there are two weighted hidden representations, first weighted representation 514 ($r_a$) and second weighted representation 516 ($r_b$). As noted, a is a vector including attention weights and r is a weighted representation of the sentence with given aspect. The operators 520, 522 (a circle with a multiplication sign inside) is a multiplication operator. The aspect embeddings 508 have been employed to decide the attention weights 510, 512 along with the sentence representations. $\{w_1, w_2, \ldots, w_T\}$ represent the word vectors in a sentence whose length is N. $v_a$ represents the aspect embedding, $\alpha$ is the attention weight, and $\{h_1, h_2, \ldots, h_T\}$ is the hidden vector. The attention mechanism 510, 512 allows the model to capture the most important part of a sentence when different aspects are considered. The way of using aspect information in aspect embedding LSTM is by allowing aspect embedding to play a role in computing the attention weight.

The attention mechanism 510, 512 can be executed by employing collaborative attention allocation. Aspect information is important when classifying the polarity of one sentence given an aspect. In conventional systems, opposite polarities can be obtained if different aspects are considered. However, in system 500 all aspects of a sentence are concurrently or simultaneously considered with the collaborative attention allocation. The attention mechanism in neural networks is inspired by the visual attention mechanism found in humans. That is, the human visual attention is able to focus on a certain region of an image with "high resolution" while perceiving the surrounding image in "low resolution" and then adjusting the focal point over time. In NLP, the attention mechanism allows the model to learn what to attend to based on the input text and what it has produced so far, rather than encoding the full source text into a fixed-length vector like standard RNN and LSTM.

As noted above, aspect-based sentiment analysis is more fine-grained. Aspect-based sentiment analysis extracts and summarizes people's opinions expressed on entities and aspects/features of entities, which are also called targets. For example, in a product review, aspect-based sentiment analysis aims to summarize positive and negative opinions on different aspects of the product respectively, although the general sentiment on the product could be positive or negative. The whole task of aspect-based sentiment analysis includes several subtasks such as aspect extraction, entity extraction, and aspect sentiment classification. For example, from the sentence, "the voice quality of this smart phone is great, however, its battery life is not acceptable," entity extraction should identify "smart phone" as the entity, and aspect extraction should identify that "voice quality" and "battery" are two aspects. Aspect sentiment classification should classify the sentiment expressed on the voice quality of the smart phone as positive and on the battery of the smart phone as negative. In conventional approaches, each aspect (e.g., "voice quality" and "battery") is handled separately and the aspects are converted to two independent training instances. In contrast, in the exemplary embodiments of the present invention, as specifically shown in FIG. 5, the aspects derived from a sentence are processed concurrently or simultaneously with collaborative attention allocation. In other words, the attention for hidden states for each aspect is computed concurrently or simultaneously. All the attentions are denoted by a single variable, such as A.

Figure 6:
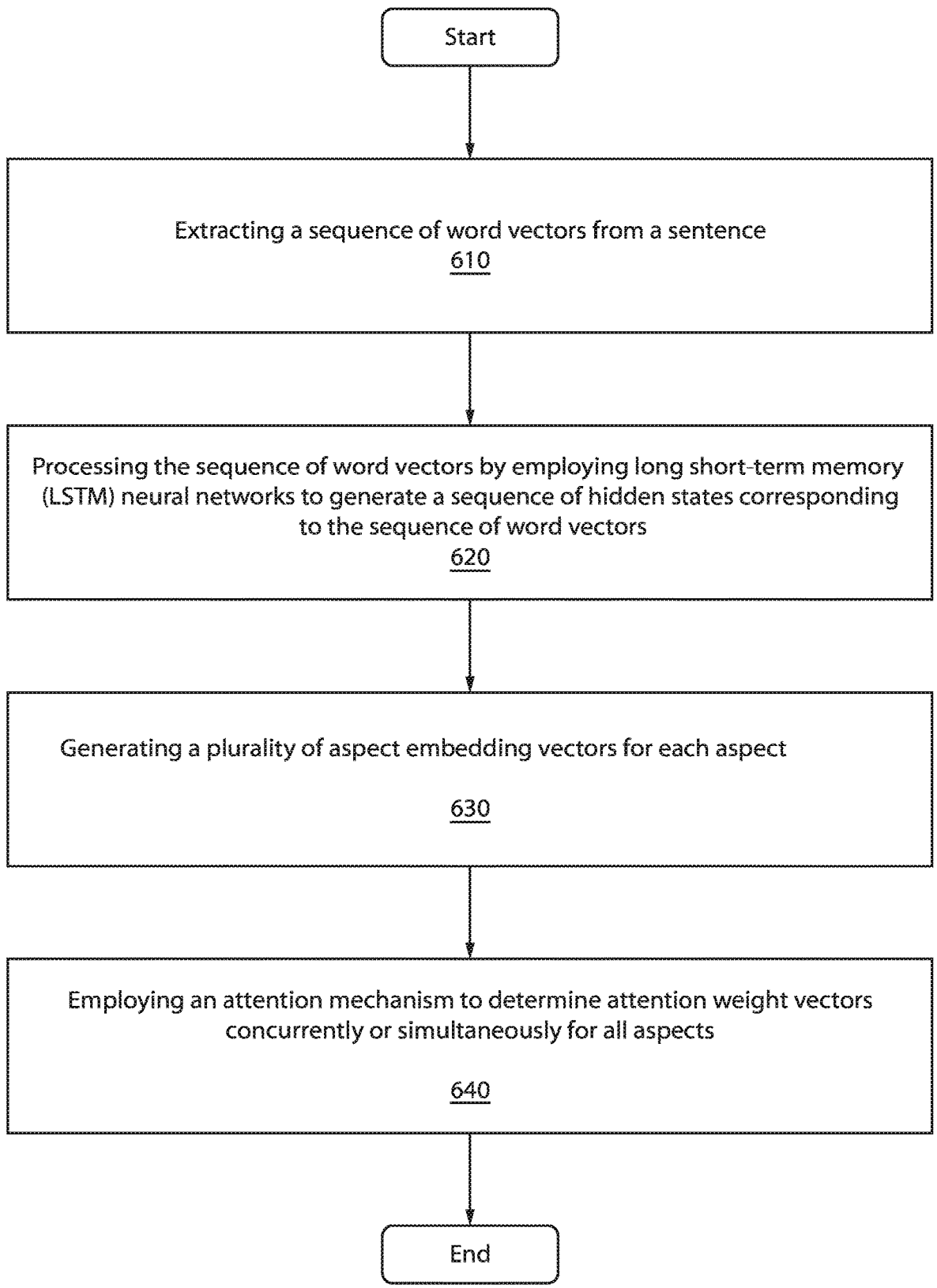
FIG. 6 is a block/flow diagram illustrating a method for concurrently modeling multiple aspects with collaborative attention allocation, in accordance with an embodiment of the present invention.

FIG. 6 is a block/flow diagram illustrating a method for concurrently modeling multiple aspects with collaborative attention allocation, in accordance with an embodiment of the present invention.

At block 610, a sequence of word vectors is extracted from a sentence. Thus, the input is a sentence and each sentence includes or mentions aspects k.

At block 620, the sequence of word vectors is processed by employing long short-term memory (LSTM) neural networks to generate a sequence of hidden states corresponding to the sequence of word vectors. Thus, the sequence of word vectors is created by word embedding and then fed into an RNN (e.g., an LSTM). The RNN outputs a sequence of hidden states.

At block 630, a plurality of aspect embedding vectors is generated for each aspect. In other words, the attention weight vector over hidden states for each aspect is computed. All the attention weight vectors can be denoted by A. The regularization can be added to A.

At block 640, an attention mechanism is employed to determine attention weight vectors concurrently or simultaneously for all aspects. The regularization forces orthogonality between attention weight vectors of different aspects so that different aspects concentrate on different parts of the sentence (with less overlapping). Given the attention weight vector, the methods compute the aspect-specific sentence representation for each aspect, k. The aspect-specific sentence representation employs the attention weights of each aspect to average the hidden states. Then, the sentiment is predicted for each aspect (aspect level sentiment classification). The sentiments can be, e.g., positive, negative or neutral.

Therefore, sentiment analysis or opinion mining is the computational study of people's opinions, sentiments, emotions, appraisals, and attitudes towards entities such as products, services, organizations, individuals, issues, events, topics, and their attributes. The inception and rapid growth of the field coincide with those of the social media on the Web, for example, reviews, forum discussions, blogs, microblogs, Twitter™, and social networks, because for the first time in human history, a huge volume of opinionated data recorded in digital forms is available. Sentiment analysis has grown to be one of the most active research areas in natural language processing (NLP). It is also widely studied in data mining, Web mining, text mining, and information retrieval. In fact, sentiment analysis has spread from computer science to management sciences and social sciences such as marketing, finance, political science, communications, health science, and even history, due to its importance to business and society as a whole. This proliferation is due to the fact that opinions are central to almost all human activities and are key influencers of peoples behaviors. Peoples beliefs and perceptions of reality, and the choices people make, are, to a considerable degree, conditioned upon how others see and evaluate the world. For this reason, whenever a decision needs to be made, a person often seeks out the opinions of others. This is not only true for individuals but also true for organizations.

Recently, if an individual wants to buy a consumer product, that individual is no longer limited to asking friends and family for opinions because there are many user reviews and discussions about the product in public forums on the Web. For an organization, it may no longer be necessary to conduct surveys, opinion polls, and focus groups in order to gather public opinions because there is an abundance of such information publicly available. Opinionated postings in social media have helped reshape businesses, and sway public sentiments and emotions, which have had a profound impact on social and political systems.

However, finding and monitoring opinion sites on the Web and distilling the information included in them remains a formidable task because of the proliferation of diverse sites. Each site usually includes a huge volume of opinion text that is not always easily deciphered in long blogs and forum postings. The average human reader will have difficulty identifying relevant sites and extracting and summarizing the opinions in them. Automated sentiment analysis systems are thus needed. The exemplary embodiments of the present invention therefore present attention-based LSTMs for aspect-level sentiment classification. The idea is to learn aspect embeddings and allow aspects participate in computing attention weights. The model of the exemplary embodiments employs collaborative attention allocation by regularization to concurrently or simultaneously model multiple aspects of a sentence. The regularization forces orthogonality between attention weight vectors of different aspects so that different aspects concentrate on different parts of the sentence (with less overlapping). Given the attention weight vector, the methods compute the aspect-specific sentence representation for each aspect, k. The aspect-specific sentence representation employs the attention weights of each aspect to average the hidden states. Then, the sentiment is predicted for each aspect (aspect level sentiment classification). The sentiments can be, e.g., positive, negative or neutral. Thus, the output is the predicted sentiment for each aspect in the sentence.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for implementing multi-aspect sentiment analysis by collaborative attention allocation (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method executed on a processor for implementing multi-aspect sentiment analysis by collaborative attention allocation, the computer-implemented method comprising:
    extracting a sequence of word vectors from a sentence received from a data stream;
    feeding the sequence of word vectors to long short-term memory (LSTM) neural networks to generate a sequence of hidden states corresponding to the sequence of word vectors;
    feeding the hidden states through aspect embedding to generate an aspect embedding vector for each aspect;
    employing an attention mechanism to determine attention weight vectors concurrently for all aspects with the collaborative attention allocation; and
    outputting predicted sentiments for each aspect to a user interface of a computing device.

2. The method of claim 1, further comprising computing an attention weight vector for each aspect.

3. The method of claim 2, further comprising regularizing each attention weight vector so that the attention weight vectors have less overlapped distribution with each other.

4. The method of claim 3, further comprising computing aspect-specific representations by employing the attention weight vector for each aspect to average the hidden states.

5. The method of claim 1, wherein the collaborative attention allocation occurs between the attention weight vectors.

6. The method of claim 1, wherein the attention weight vectors are computed over the hidden states for each aspect.

7. The method of claim 1, wherein the predicted sentiments are positive, negative or neutral.

8. A non-transitory computer-readable storage medium comprising a computer-readable program executed on a processor in a data processing system for implementing multi-aspect sentiment analysis by collaborative attention allocation, wherein the computer-readable program when executed on the processor causes a computer to perform the steps of:
    extracting a sequence of word vectors from a sentence received from a data stream;
    feeding the sequence of word vectors to long short-term memory (LSTM) neural networks to generate a sequence of hidden states corresponding to the sequence of word vectors;
    feeding the hidden states through aspect embedding to generate an aspect embedding vector for each aspect;
    employing an attention mechanism to determine attention weight vectors concurrently for all aspects with the collaborative attention allocation; and
    outputting predicted sentiments for each aspect to a user interface of a computing device.

9. The non-transitory computer-readable storage medium of claim 8, wherein an attention weight vector is computed for each aspect.

10. The non-transitory computer-readable storage medium of claim 9, wherein each attention weight vector is regularized so that the attention weight vectors have less overlapped distribution with each other.

11. The non-transitory computer-readable storage medium of claim 10, wherein aspect-specific representations are computed by employing the attention weight vector for each aspect to average the hidden states.

12. The non-transitory computer-readable storage medium of claim 8, wherein the collaborative attention allocation occurs between the attention weight vectors.

13. The non-transitory computer-readable storage medium of claim 8, wherein the attention weight vectors are computed over the hidden states for each aspect.

14. The non-transitory computer-readable storage medium of claim 8, wherein the predicted sentiments are positive, negative or neutral.

15. A system for implementing multi-aspect sentiment analysis by collaborative attention allocation, the system comprising:
  a memory; and
  one or more processors in communication with the memory configured to:
    extract a sequence of word vectors from a sentence received from a data stream;
    feed the sequence of word vectors to long short-term memory (LSTM) neural networks to generate a sequence of hidden states corresponding to the sequence of word vectors;
    feed the hidden states through aspect embedding to generate an aspect embedding vector for each aspect;
    employ an attention mechanism to determine attention weight vectors concurrently for all aspects with the collaborative attention allocation; and
    output predicted sentiments for each aspect to a user interface of a computing device.

16. The system of claim 15, wherein an attention weight vector is computed for each aspect.

17. The system of claim 16, wherein each attention weight vector is regularized so that the attention weight vectors have less overlapped distribution with each other.

18. The system of claim 17, wherein aspect-specific representations are computed by employing the attention weight vector for each aspect to average the hidden states.

19. The system of claim 15, wherein the collaborative attention allocation occurs between the attention weight vectors.

20. The system of claim 15, wherein the attention weight vectors are computed over the hidden states for each aspect.

* * * * *